Dec. 10, 1963     J. H. LOBECK     3,113,813

SEALED ROLLER BEARING

Filed March 2, 1961

JOHN H. LOBECK
INVENTOR.

BY Mason, Porter, Diller & Stewart
attorneys

United States Patent Office 3,113,813
Patented Dec. 10, 1963

3,113,813
SEALED ROLLER BEARING
John H. Lobeck, South Bend, Ind., assignor to The Torrington Company, Torrington, Conn., a corporation of Maine
Filed Mar. 2, 1961, Ser. No. 92,929
2 Claims. (Cl. 308—187.2)

The description which follows relates to a sealed roller bearing primarily intended to be placed between a non-rotary pin, shaft or the like and a sheave or similar rotating part.

Bearings of this type are subjected to severe operating conditions and must be protected against the intrusion of foreign matter such as dust, grit, water and the like. It is most desirable, also, that such bearings be as free as possible of friction between the parts. At the same time adequate provision must be made for suitable lubrication.

One of the objects of this invention is to provide a seal between the parts of a roller bearing with a minimum of frictional contact. Another object of the invention is to provide a seal which may be resiliently inserted in place and free to serve its purpose without wear.

A still further object of the invention is to provide a seal which forms a baffle or labyrinth against the loss of lubricant without at the same time establishing friction between relatively movable parts.

A still further object of the invention is to provide for a unit assembly of the bearing such that it may be installed and removed as a single operating element.

The above and other objects of the invention are set forth in detail in the following specification and illustrated by way of example on the attached drawings on which:

FIG. 4 is a similar section of the bearing assembly for direct mounting on a shaft or the like.

Figure 1:
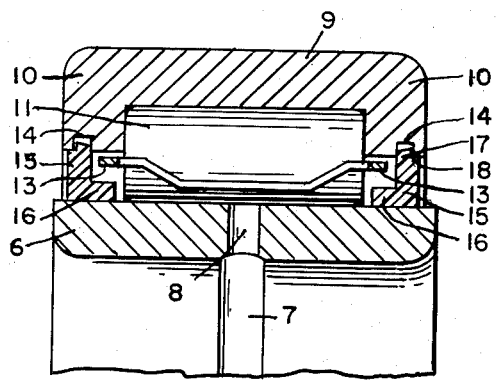
FIG. 1 is a transverse section of the improved sealed roller bearing.

By way of illustrating the preferred form of the invention there is shown in the drawings a resilient plastic seal which is interposed between the inner and outer races of a roller bearing. It is frictionally attached to the inner bearing race on the one hand and loosely held in the outer raceway without material frictional engagement.

Referring to FIGURE 1 there is shown an inner race 6. This race is immovably fixed on a pin or the like, not shown, and is intended not to rotate. This inner race has an oil groove 7 with an oil supply hole 8 by which a suitable lubricant oil or grease may be introduced into the chamber holding the bearing rollers.

The outer race 9 may be part of the hub of a sheave or like rotating member. The race 9 has inwardly projecting end flanges 10.

The bearing rollers 11 are held between the flanges 10, 10 and spaced each from the other by means of the retainer 12 having ends 13, subtending the flanges proper.

Each flange has a circular groove 14, 14.

The sealing element proper is a ring 15 made of suitable plastic which is oil-proof and is somewhat resilient. This ring fits tightly by friction on the outer surface of the inner race opposite one of the grooves 14 in the flanges. Due to the resilience of the plastic ring, it may be forced into a fixed position on the inner race in the desired relation to the flange.

The ring has a broad base 16 for suitable adherence to the inner race 6. The ring itself extends outwardly and terminates in a narrow rib 17. As shown in FIGURE 1, this is formed by a setback 18 on the outer face of the ring.

The outer edge of the rib 17 is sloped inwardly and downwardly. By this arrangement it is possible in forcing the ring into its position to deflect the upper part of the rib 17 so that it will pass the inner edge of the flange 10 and snap into position in the groove 14.

The upper edge of the rib 17 does not extend to the full distance of the groove 14, but leaves a slight clearance. In like manner a slight clearance is provided between the side walls of the rib and the side walls of the groove.

It will be understood that one seal is provided opposite each flange 10.

A small hole not shown is provided transversely of the ring. This allows for equalization of pressure between the opposite sides of the rib so that lubrication may be introduced and a pumping action avoided in the operation of the bearing. In practical operation this hole and the clearances around the rib 17 will be sufficiently filled with heavy lubricant such as grease as to prevent the intrusion of foreign matter.

In assembly the usual practice will be followed of arranging the rollers and the retainer within the chamber of the outer race, then slipping them into place over the inner race. A ring 15 may be pushed over the surface of the inner ring until the deflected rib is inserted within the groove 14. Thus a baffle is provided without material sliding contact between the outer race and the ring.

Figure 2:
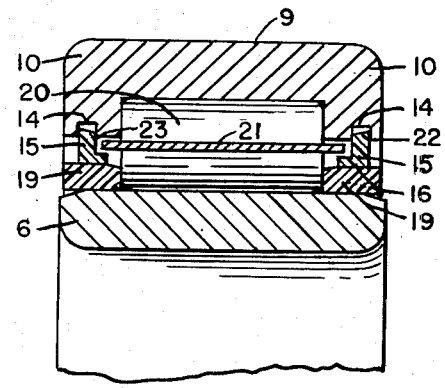
FIG. 2 is a similar view of a modified form.

In the form shown in FIGURE 2, the inner race carries two collars 19, 19. These collars are opposite the flanges 10, 10 in the outer race 9. The rollers 20 and their retainer 21 occupy the space between the collars 19, 19.

A ring 15 may then be slipped over each collar 19 until it is opposite the groove 14 of the adjacent flange 10.

In this instance the ring 15 has a wide base 16 and upstanding rib 22. The rib 22 is of uniform width to the sloping top 23 and does not have the setback described above.

The operation, however, is the same in that the side walls of the rib form slightly spaced baffles with the side walls of the groove 14 and thus seal the bearing.

Figure 3:
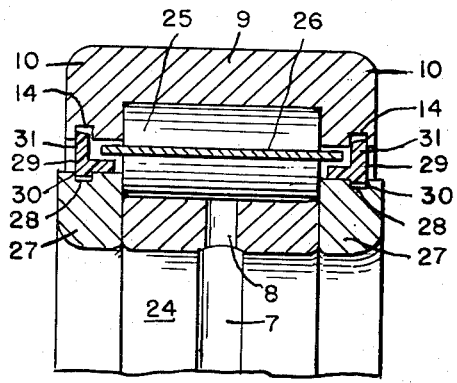
FIG. 3 is a transverse section showing the sealed roller bearing as assembled for unitary handling.

In FIGURE 3 a further modification is shown in which the inner and outer races are keyed together by the sealing means so that the assembled bearing can be handled as a unit.

Thus the inner race is in the form of an annulus 24 which conforms in width to the length of the bearing rollers 25. The usual retainer 26 holds the rollers 25 in place.

An end plate 27 is fitted on each end of the annulus 24 opposite the flange 10 of the outer race 9. The outer race carries the groove 14 above described. Opposite this groove each side plate 27 has a similar groove 28. The seal consists of a ring 29. This has a depending rib 30 which fits within the groove 28.

The ring 29 is of resilient plastic adapted to slide over the face of the end plate 27 until the rib 30 drops into the groove 28 where it has a tight fit.

The upstanding rib 31 of the sealing ring 29 has an inwardly sloping top surface. When the ring 29 is pushed over the surface of the end plate 27, the upstanding rib 31 is deflected. As the depending rib drops into the groove 28, the upstanding rib 31 is released to slide into the groove 14. In this position the sloping face is out of contact with the base of the groove, while the side walls of the rib 31 have a slight clearance from the side walls of the groove. In this way a frictionless baffle is provided to prevent escape of lubricant or entrance of foreign matter.

The advantage of this form is that it can be assembled as a complete bearing and installed as a unit.

The sealing arrangement above described forms an improved and advantageous adjunct to the roller bearing unit. It provides for ready installation, being mounted fixedly on the inner race member. It then becomes a positioning element for the outer race, particularly as shown in FIGURE 1.

The seal is effective not only to hold the parts in position for unitary application as in FIGURE 3, but also to form a substantially frictionless seal against loss of lubricant. The baffle effect is such as to prevent the entrance of foreign matter.

Figure 4:
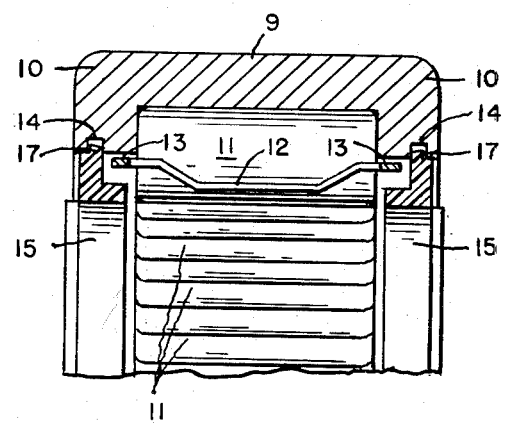

The essential features of the novel bearing may also be embodied in a form which can be handled as a unit for installation on a shaft or like in place of using an inner roller race. Such a construction is illustrated on FIG. 4. The outer race 9 has inwardly projecting end flanges 10, 10, as described above. Likewise the rollers are confined between the flanges by the retainer 12 having ends B, B subtending the flanges. Beyond the retainer the flanges have circular grooves 14, 14 to receive the rings 15, 15.

The rings are held in place by engagement of the narrow ribs 17, 17. This engagement is sufficient to hold the rings in place and keep the retainer, and consequently the rollers against inadvertent displacement. The bearing can therefore be packed as a unit and installed merely by sliding the rings over a shaft or the like serving as an inner race for the rollers.

The invention has been described in its preferred form and is illustrated without however limiting the invention other than as defined by the following claims.

What is claimed is:
1. A sealed roller bearing comprising an inner race having opposite end plates, an outer race having flanges with circular grooves, a series of bearing rollers between said flanges and end plates, a retainer for the rollers, said side plates having grooves opposite the grooves in the flanges, an elastic ring having a frictional fit on each plate, a depending rib on each ring fitting the groove in the plate, and an upstanding rib loosely held within the groove of a flange.

2. A sealed roller bearing comprising an inner race having opposite end plates, an outer race having flanges with circular grooves, a series of bearing rollers between said flanges and end plates, a retainer for the rollers, said side plates having grooves opposite the grooves in the flanges, an elastic ring having a relatively wide base frictionally held on each plate, a narrow depending rib on each ring fitting the groove in the plate, and a narrow upstanding rib loosely held within the groove of a flange.

References Cited in the file of this patent
UNITED STATES PATENTS

| | | |
|---|---|---|
| 2,265,554 | Thomas | Dec. 9, 1941 |
| 2,360,078 | Smith et al. | Oct. 10, 1944 |
| 2,571,352 | Fast | Oct. 16, 1951 |
| 2,770,508 | Smith | Nov. 13, 1956 |
| 2,807,509 | Anderson | Sept. 24, 1957 |
| 2,838,349 | Maas | June 10, 1958 |
| 3,004,808 | Powers | Oct. 17, 1961 |
| 3,007,752 | Gales | Nov. 7, 1961 |